(12) United States Patent
Tilaye et al.

(10) Patent No.: US 10,737,169 B1
(45) Date of Patent: Aug. 11, 2020

(54) APPARATUS, SYSTEMS AND METHODS FOR INITIATING COMMUNITY MEMBER PARTICIPATION

(71) Applicant: DISH Network L.L.C., Englewood, CO (US)

(72) Inventors: Swapnil Tilaye, Thornton, CO (US); Srinath Raghavan, Parker, CO (US)

(73) Assignee: DISH Network L.L.C., Englewood, CO (US)

( * ) Notice: Subject to any disclaimer, the term of this patent is extended or adjusted under 35 U.S.C. 154(b) by 0 days.

(21) Appl. No.: 16/289,181

(22) Filed: Feb. 28, 2019

(51) Int. Cl.
| | | |
|---|---|---|
| *A63F 13/216* | (2014.01) | |
| *G06Q 30/02* | (2012.01) | |
| *G06F 16/9536* | (2019.01) | |
| *A63F 13/33* | (2014.01) | |

(52) U.S. Cl.
CPC ............ *A63F 13/216* (2014.09); *A63F 13/33* (2014.09); *G06F 16/9536* (2019.01); *G06Q 30/0224* (2013.01)

(58) Field of Classification Search
None
See application file for complete search history.

(56) References Cited

U.S. PATENT DOCUMENTS

| | | | | |
|---|---|---|---|---|
| 2014/0278946 | A1* | 9/2014 | Powell | G06Q 30/0261 |
| | | | | 705/14.47 |
| 2015/0133209 | A1* | 5/2015 | Patterson | A63F 13/58 |
| | | | | 463/25 |
| 2018/0173388 | A1* | 6/2018 | Holmes | G10L 15/187 |
| 2019/0147496 | A1* | 5/2019 | Faraguna | G06Q 30/0271 |
| 2019/0340631 | A1* | 11/2019 | Seshadri | G06T 11/60 |
| 2019/0355016 | A1* | 11/2019 | Levi | A63F 13/65 |

\* cited by examiner

*Primary Examiner* — James S. McClellan
*Assistant Examiner* — Peter J Iannuzzi
(74) *Attorney, Agent, or Firm* — Perkins Coie LLP

(57) ABSTRACT

An interaction facilitator system is operable acquire community member dialogue videos generated by community members, wherein each community member dialogue video includes dialogue spoken by the community member that describes their viewpoints and opinions regarding an associated subject media content event. A community member dialogue video is acquired from a community member while the community member plays a uniquely generated geo-activity game wherein the community member completes an activity at each of a plurality of game play locations that lie along a game play route. At the end of play of the geo-activity game, the community member receives an incentive.

21 Claims, 5 Drawing Sheets

APPARATUS, SYSTEMS AND METHODS FOR INITIATING COMMUNITY MEMBER PARTICIPATION

BACKGROUND

Participation on a social media platform, such as on a social TV and movie platform, by individual community members may be difficult to initialize. Such participation activities may include generating and/or consuming (viewing) content reviews, such as reviews pertaining to media content events. A media content event review presents viewpoints and opinions of a community member regarding an associated subject media content event.

Typically, a media content event as defined herein presents theme-based visual and audio content to a user for their enjoyment and/or for informative purposes (interchangeably referred to herein as a thematic media content event). Examples of such theme-based media content events include movies, films, serial programming, sporting events, documentaries, newscasts, religious programs, commercials (typically of short duration with advertising content), or the like. Serial programming may present a continuing plot and/or theme, often with the same cast of actors, in a sequential episode-by-episode basis that is available periodically. Advertisements, commercials or the like may be interspersed within the media content event.

The initial participation by such community members may be low at first because such community members may just want to sit back, relax, and be entertained by activities occurring on the social platform. In other instance, such as when the social platform is beginning and thus has relatively little community member participation and/or relatively few media content event reviews to offer other community members, participation may be relatively low. In other instances, such as with a new movie that has just been released to the public for consumption, there may be none or relatively few media content event reviews of the movie for the community members of the social media platform to consume.

Accordingly, there is a need in the arts to facilitate and encourage interactions of community members with the social media platform. More particularly, there is a need to encourage community members to provide their media content event reviews of media content events.

SUMMARY

An interaction facilitator system is operable acquire community member dialogue videos generated by community members, wherein each community member dialogue video includes dialogue spoken by the community member that describes their viewpoints and opinions regarding an associated subject media content event. In accordance with an exemplary non-limiting embodiment, a community member dialogue video is acquired from a community member while the community member plays a uniquely generated geo-activity game wherein the community member completes an activity at each of a plurality of game play locations that lie along a game play route. At the end of play of the geo-activity game, the community member receives an incentive.

BRIEF DESCRIPTION OF THE DRAWINGS

Preferred and alternative embodiments are described in detail below with reference to the following drawings.

DETAILED DESCRIPTION

Figure 1:
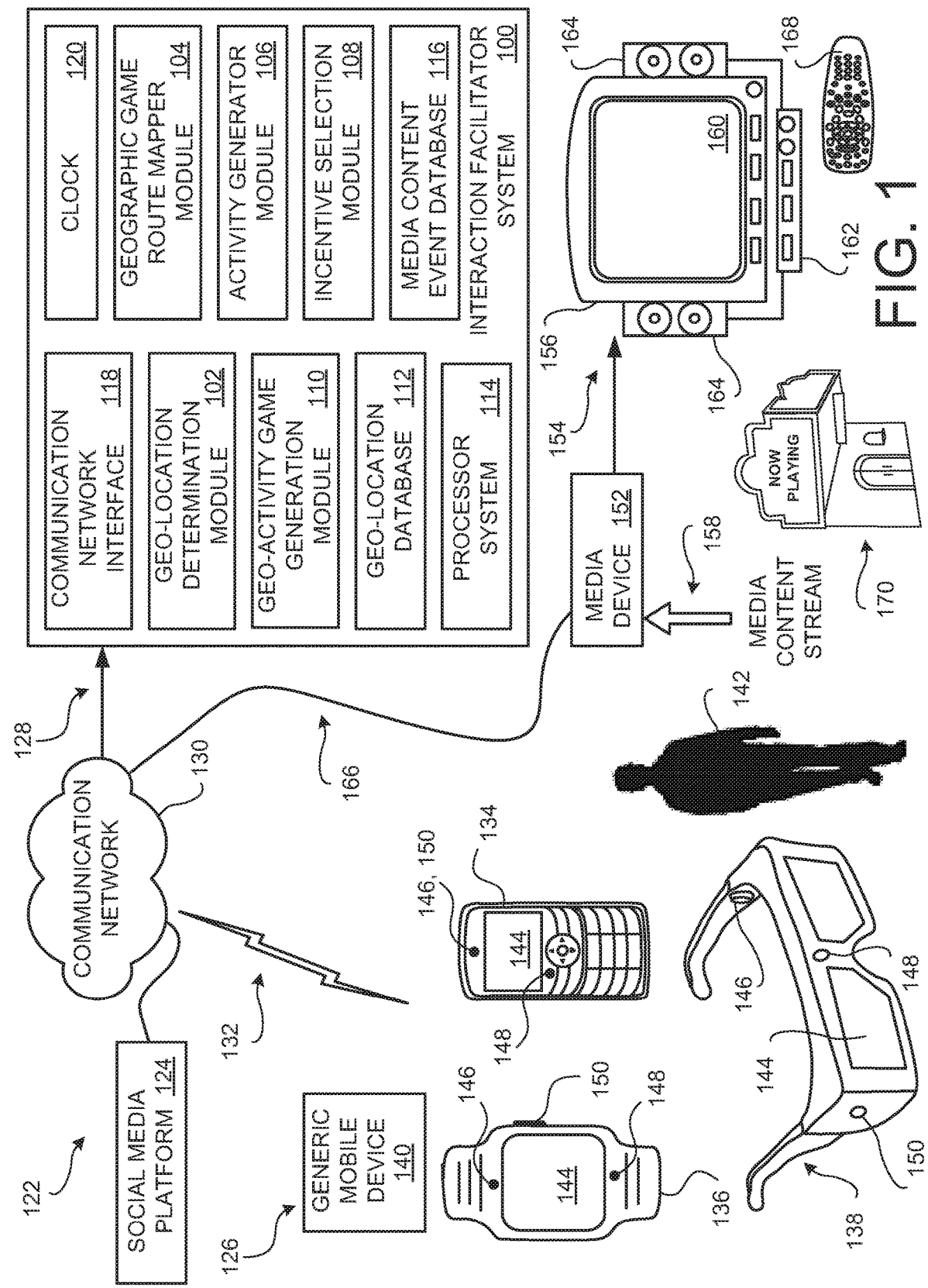
FIG. 1 is a block diagram of an embodiment of a community member interaction facilitator system.

FIG. 1 is a block diagram of an embodiment of a community member interaction facilitator system 100. Embodiments of the interaction facilitator system 100 engage a participating community member in a geo-activity game so that a community member media content event review (interchangeably referred to herein as a community member dialogue video) may be acquired from the participating community member at some point during play of the geo-activity game.

Embodiments of the interaction facilitator system 100 may identify a current location of a community member of interest. Then, based on a determined current location of the community member of interest and a particular media content event that has been watched (consumed) by the community member, embodiments of the interaction facilitator system 100 generate a geo-activity game to entice the participating community member to provide a community member dialogue video that presents their viewpoints and opinions regarding the associated subject media content event.

As enough community member dialogue videos and other types of dialogue videos (that are all related to the same media content event) are acquired from different community members and other individuals who are knowledgeable about the subject media content event, a conversation video may be generated. The conversation video present opinions and topics about the subject media content event which may be later consumed by other community members, as disclosed in U.S. Pat. No. 9,467,718, entitled "Apparatus, System, and Methods for a Content Commentary Community" which issued on Oct. 11, 2016, and which is incorporated by reference herein by its entirety. The conversation video that emulates a conversation among the community members and the other knowledgeable individuals who appear to be discussing the subject media content event. A requesting community member may then later consume the generated conversation video to obtain various information concerning the subject media content event. Preferably, the conversation video is consumed by the requesting community member using a virtual world reality presentation system or the like.

A generated geo-activity game is similar to a scavenger hunt and/or treasure hunt, combined with a trivia contest. The geo-activity game presents a sequence of activities that are to be performed by the participating community member at a plurality of game play locations. Preferably, the activities in the geo-activity games are very enjoyable to perform.

Activities may include gathering a specified item at an indicated game play location. For example, but not limited to, the participating community member may be required to obtain and/or purchase a promotional item that is related to the subject media content event. Preferably, if purchase of a promotional item is required, the cost to buy the promotional item is relatively low so as not to inconvenience or be a financial burden the participating community member. For example, an inexpensive a candy bar or the like may have a wrapper that presents promotional materials associated with the subject media content event. The participating community member may be instructed to purchase the candy bar. Their purchase may be confirmed based on point of sale information that is generated by their purchase (such as when using a credit card or debit card). Alternatively, the participating community member may have to take a picture (capture an image) using their mobile device 126 of them opening and/or eating the candy bar. In some instances, the acquired item may serve as a memento of the subject media content event that may later remind the participating community member of their geo-activity game play experience and/or of the subject media content event.

Alternatively or additionally, an activity may require the participating community member to perform and/or complete a specific task at an indicated game play location identified on a geo-activity game play list. For example, the participating community member may have to take a picture (capture an image) using their mobile device 126 of some physical object that is located at the game play location. If the object is a billboard advertising the subject media content event, the participating community member may be tasked with taking their photograph or video in front of the billboard. In some instances, completion of the task may serve as a memento of the subject media content event that may later remind the participating community member of their geo-activity game play experience and/or of the subject media content event.

Additionally, or alternatively, the participating community member may be asked to solve and provide answers to various trivia questions and/or other presented challenges. In some situations, a trivia question is answered at a specific geographic game play location (geo-location) indicated on the geo-activity game play list that the participating community member must physically be at when providing their trivia question answer. Preferably, the geo-activity game activities are related to the subject media content event.

Activity information for each particular game play location is provided to the participating community member. The information may include a clue of the like that the participating community member is to solve so that they can determine the particular activity that is to be completed at that particular game play location. Alternatively, or additionally, an activity clue may be provided that can be used to identify the next game play location. That is, the current activity clue may be solved by the participating community member so identify the next game play location.

At some point during the geo-activity game, the participating community member is solicited for a community member dialogue video. During generation of the community member dialogue video by the participating community member, the participating community member verbally expresses their personal opinions and/or personal viewpoints about a particular thematic content event (interchangeably referred to herein as the subject media content event). Audio capture devices (microphones) acquire audio information as the community member is speaking (audible dialogue) about the subject media content event. Image capture devices (cameras) acquire video or still image information. Preferably, the acquired video information includes a video image of the community member who is generating the community member dialogue video. Preferably, the acquired audio information includes a recording of the community member's voice as they are speaking their community member dialogue video.

Once the participating community member has completed all of the activities proscribed by their unique geo-activity game, the participating community member receives a geo-activity game incentive. The geo-activity game incentive may be a reward, a gift, an entitlement or the like. For example, the reward might be an amount of cash, a credit, a gift certificate, money or some other monetary-based and/or point-based award. Alternatively, or additionally, the geo-activity game incentive may be an entitlement voucher for an item and/or a service. The geo-activity game incentive may be related to the subject media content event, such as movie pass to a sequel or to another related media content event, memorabilia related to the subject media content event, and/or memorabilia related to other events. Other examples of entitlements are gift coupons for products or services, such as a free soda drink, popcorn, and/or candy that is available from the concessions stand at a movie theatre. Alternatively, or additionally, the gift coupon may be for purchase of a goods or service that is unrelated to the subject media content event, but is obtained by a vendor at a particular geo-location on the geo-activity game play list. Any suitable incentive may be used in the various embodiments.

The example embodiment of the interaction facilitator system 100 illustrated in FIG. 1 comprises a geo-location determination module 102, a geographic route mapper module 104, an activity generator module 106, an incentive selection module 108, a geo-activity game generation module 110, a geo-location database 112, a processor system 114, a media content event database 116, a communication network interface, and an optional clock 120. The various modules and the geo-location database 112 reside in a suitable memory medium. In some embodiments, the geo-location determination module 102, the geographic route mapper module 104, the activity generator module 106, the incentive selection module 108, and/or the geo-activity game generation module 110 may be integrated together, and/or may be integrated with other logic modules. Further, the various modules, the geo-location database 112 and/or the media content event database 116 may be implemented using a distributed architecture system and/or a peer-to-peer system wherein the various modules and databases reside in different locations. Further, portions of the modules and/or databases may be distributed in different locations. In other embodiments, some or all of these memory and other data manipulation functions may be provided by using a remote server or other electronic devices suitably connected via the Internet or otherwise to a client device. Other embodiments may include some, or may omit some, of the above-described media processing components. Further, additional components not described herein may be included in alternative embodiments.

To facilitate description of operation of the interaction facilitator system 100, FIG. 1 illustrates a simplified hypothetical example operating environment 122. The interaction facilitator system 100 is communicatively coupled to one or more social media platforms 124, one or more mobile user devices 126, and one or more media devices 152 via a communication network 130.

The communication network interface 118 communicatively couples the interaction facilitator system 100 to the communication network 130 via a suitable wireless or wire-based communication signal 128. The communication network 130 is illustrated as a generic communication system. In one embodiment, the communication network 130 comprises a cellular telephone system, such as a radio frequency (RF) wireless system. Accordingly, the mobile user devices 126 includes a suitable transceiver configured to receive and transmit wireless communications 132. Alternatively, the communication network 130 may be a telephony system, the Internet, a Wi-fi system, a microwave communication system, a fiber optics system, an intranet system, a local access network (LAN) system, an Ethernet system, a cable system, a radio frequency system, a cellular system, an infrared system, a satellite system, or a hybrid system comprised of multiple types of communication media. Additionally, the various devices illustrated in FIG. 1 may be implemented to communicate using other types of communication technologies, such as but not limited to, digital subscriber loop (DSL), X.25, Internet Protocol (IP), Ethernet, Integrated Services Digital Network (ISDN) and asynchronous transfer mode (ATM). Also, embodiments of the media device 102 may be configured to communicate over combination systems having a plurality of segments which employ different formats for each segment that employ different technologies on each segment.

Example mobile user devices 126 include a smart phone 134 or the like, a smart watch 136, an augmented or virtual reality device 138, and a generic mobile device 140. A participating community member 142 (interchangeably referred to herein as a user 142) uses their mobile device 126 to participate in a geo-activity game that has been uniquely generated for that particular participating community member 142. The unique geo-activity game is based, in part, on a determined geographic location (geo-location) of the participating community member 142. Preferably, the geo-activity game relates to the subject media content event that the participating community member 142 has recently consumed.

Preferably, each of the mobile user devices 126 includes a display 144 on which still or video images may be presented to facilitate participation by the community member 142 while playing the geo-activity game. Alternatively, or additionally, the mobile user devices 126 may have one or more speakers 146 that are used by the interaction facilitator system 100 to provide audible information to the participating community member 142 during the geo-activity game. Further, the interaction facilitator system 100 may use the displays 144 to provide visual information (video images, still images, and/or textual information) to the participating community member 142 during the geo-activity game.

Further, each of the mobile user devices 126 preferably include one or more input devices that are configured to receive input from the participating community member 142 while they are playing the geo-activity game. For example, the mobile user devices 126 may have an image capture device 148 (camera 148) that is used by the participating community member 142 to provide image input (video and/or still images) to the interaction facilitator system 100 during the geo-activity game. Alternatively, or additionally, the mobile user devices 126 may have a microphone 150 that is used by the participating community member 142 to provide audio input to the interaction facilitator system 100 during the geo-activity game. The generic mobile device 140 is intended to be any device now known or later developed that may be used by the participating community member to play a geo-activity game.

In practice when a unique geo-activity game is initially generated, embodiments of the interaction facilitator system 100 identify the participating community member, identify a particular subject media content event that is of interest (for acquiring a community member dialogue video from the participating community member), and a current location of the participating community member. Optionally, a date and/or a time that the participating community member consumed the subject media content event is also determined.

Embodiments of the interaction facilitator system 100 identify a media content event that has been recently consumed by the participating community member. The recently consumed media content event may be identified using any suitable identifier, such as the title or the like of the media content event. The interaction facilitator system 100 may obtain media content event consumption information that indicates what particular media content events have been consumed, and when the media content events were consumed, by a community member.

The participating community member may consume a particular media content event in a variety of manners that can be detected by embodiments of the interaction facilitator system 100. For example, the consumption of a media content event may occur when the participating community member uses their media device 152 to present the media content event on a media presentation system 154, such as a television 156 or the like. The presenting media content event may be received in a suitable media content stream 158 that is received by the media device 152. A video portion of the presenting media content event is presented on a display 160. An audio portion of the presenting media content event may be presented using the speakers (not shown) of the television 156. Alternatively, or additionally, the audio portion may be presented using a surround stereo system 162 or the like that has one or more external speakers 164.

In some embodiments of the media device 152, a suitable back channel interconnection 166 to the communication network 130 enables the interaction facilitator system 100 to acquire media content event consumption information that identifies the currently presenting (or even a previously consumed) media content event that was presented by the media device 152. The back channel interconnection 166 is illustrated as a wire-based connector. Alternatively, or additionally, the back channel interconnection 166 may be a wireless connection to the communication network 130. In some situations, the media device 152 provides the media content event consumption information identifying consumed media content events to the interaction facilitator system 100. Alternatively, or additionally, the interaction facilitator system 100 may generate and communicate a query to the media device 152 requesting the media content event consumption information identifying consumed media content events. Alternatively, or additionally, the participating community member may operate their media device 152 using a remote control 168 to communicate a request to the interaction facilitator system 100 inquiring whether a geo-activity game is available for the media content event that has been consumed using their media device 152. If the participating community member is eligible for participation in a geo-activity game for that particular consumed media content event, then a geo-activity game invitation may be sent to the participating community member to participate in a unique geo-activity game that is then generated for that particular participating community member.

In other situations, the participating community member may consume a media content event using their mobile device 126. The mobile device 126 may provide the media content event consumption information identifying consumed media content events to the interaction facilitator system 100. Alternatively, or additionally, the interaction facilitator system 100 may generate and communicate a query to the mobile device 126 requesting information identifying consumed media content events. Alternatively, or additionally, the participating community member may operate their mobile device 126 to communicate a request to the interaction facilitator system 100 inquiring whether a geo-activity game is available for the media content event that has been consumed using their mobile device 126 (or event their media device 152). If the participating community member is eligible for participation in a geo-activity game for that particular consumed media content event, then a geo-activity game invitation may be sent to the participating community member to participate in a unique geo-activity game that is then generated for that particular participating community member.

In yet other situations, the participating community member may consume a media content event at a theatre 170. Location information identifying the locations of public or private theaters may be stored by the interaction facilitator system 100. When a detected current location of the participating community member is determined that corresponds to or is the same as the location of the theatre 170, then a reasonable assumption may be made that the participating community member is consuming a media content event that is playing at the theatre 170. Current location of the participating community member may be determined based on a determinable location of their mobile device 126 (who is presumably in current possession of their mobile device 126). Alternatively, or additionally, the location of the participating community member at the theatre 170 may be determined from a point of purchase sale using a credit card or the like, such as when a theatre ticket is purchased or consumables are purchased at a concessions stand. Alternatively, or additionally, the participating community member may operate their mobile device 126 to indicate that they have consumed a particular media content event at the theatre 170, and to indicate that they would be willing to participate in a geo-activity game associated with the recently consumed media content event. Once the interaction facilitator system 100 determines that the participating community member has been at the theatre 170 (based on the location-based media content event consumption information), then an identifier of one or more media content events that are currently playing at the theatre are obtained. The identifiers of media content events that are currently playing at the theatre can be obtained from any suitable source, such as internet-based movie ticket outlets, web pages of the theatre 170, or the like.

In other situations, the participating community member may operate their mobile device 126 to indicate that they have recently consumed a particular media content event, and to indicate that they would be willing to participate in a geo-activity game associated with the recently consumed media content event. The participating community member may generate a geo-activity game inquiry using their mobile device 126 or their media device 152. The geo-activity game inquiry would include the media content event consumption information identifying the participating community member and would include information identifying the media content event that has been consumed by the participating community member. Optionally, the geo-activity game inquiry would include the time (and date) of consumption of the subject media content event. If the participating community member is eligible for participation in a geo-activity game for that particular consumed media content event, then a geo-activity game invitation may be sent to the participating community member to participate in a unique geo-activity game that is then generated for that particular participating community member.

Preferably, the participating community member has just completed, or has recently completed, consumption of the identified subject media content event. In the various embodiments, optionally, a time of consumption of the subject media content event (defined by a date and/or a clock time) is compared with a current date and/or time to define a consumption duration. The optionally determined consumption duration is compared with a predefined consumption duration threshold. If the determined consumption duration is less than or equal to the consumption duration, then a presumption can be made that the recollection of the participating community member of the recently consumed subject media content event will be accurate enough for the participating community member to meaningfully articulate their viewpoints and opinions regarding the recently consumed subject media content event. If the determined consumption duration is less than or equal to the consumption duration, then a presumption can be made that the recollection of the participating community member of the recently consumed media content event will not be sufficiently accurate enough for the participating community member to meaningfully articulate their viewpoints and opinions regarding the subject media content event.

Next, embodiments of the interaction facilitator system 100 determine whether the recently consumed media content event (which occurred within the consumption duration threshold) is a media content event of interest for which a community member dialogue video is desired. That is, a determination is made whether a community member dialogue video should be acquired from the participating community member for the recently consumed media content event. For example, if the recently consumed subject media content event has just been released to the public, the likelihood is relatively high that there are not a large enough number of acquired community member dialogue videos to generate a conversation video that can be consumed by other community members. In this situation, the interaction facilitator system 100 may determine that acquiring a community member dialogue video for this particular subject media content event is desired.

To determine whether the recently consumed media content event is a media content event of interest (for which a community member dialogue video is desired), the identifier of the recently consumed media content event is compared with the identifiers of the media content events stored in the media content event database 116. Here, an identifier of a particular media content event is added into the media content event database 116 when a determination is made that one or more additional community member dialogue videos should be acquired from the social media platform community membership. Thus, when a new media content event is released for public consumption, the identifier of that mew media content event is added into the media content event database 116. As another example, if the social media platform is in the process of initialization, the identifiers of many different media content events may be added into the media content event database 116 so that a plurality of conversation videos can be generated for consumption by community members. As yet another example, a determination may be made that a previously generated conversation video should be modified, such as by changing the conversation video to use newly acquired community member dialogue videos from other community members (and by deleting selected previously acquired community member dialogue videos). Alternatively, or additionally, the duration of an existing conversation video could be increased by adding additional community member dialogue videos. In the various embodiments, the media content event database 116 is maintained by the social media platform 124 and/or by another interested party.

If the identifier of the recently consumed media content event matches one of the identifiers of the media content events stored in the media content event database 116, (and optionally, if the determined consumption duration is less than or equal to the consumption duration threshold), then embodiments of the interaction facilitator system 100 may determine that the participating community member is qualified to participate in a geo-activity game that is uniquely generated for that particular participating community member. Summarizing, this qualification process to determine if the participating community member is eligible to participate in the geo-activity game comprises (1) determining if the media content event has been recently consumed (determined when the consumption duration is less than or equal to the consumption duration threshold) by the participating community member, and (2) determining if the recently consumed media content event is a media content event of interest (interchangeably referred to herein as the subject media content event) where acquisition of that participating community member's community member dialogue video is desired.

Optionally, after qualification (identification of an eligible participating community member and identification of the subject media content event), embodiments of the interaction facilitator system 100 query the identified community member to inquire whether that community member would like to participate in a geo-activity game. That is, embodiments generate and communicate a geo-activity game invitation to the community member to participate in a geo-activity game.

In an example embodiment, a query (the geo-activity game invitation) is generated by the interaction facilitator system 100 and is then communicated to the mobile device 126 of the participating community member. The query may indicate the subject media content event, and/or may indicate the incentive that will be provided to the participating community member after completion of the geo-activity game. In one example embodiment, a text message based geo-activity game invitation may be presented on the display 144 that the participating community member may respond to using a reply text message. An icon or the like may be presented on the display 144 or the display 160 that is selectable by the participating community member to indicate their acceptance of the geo-activity game invitation (or alternatively, to indicate their declining of the geo-activity game invitation).

The participating community member may then respond affirmatively to a geo-activity game invitation by indicating that they wish to participate in the geo-activity game. That is, the participating community member may accept the geo-activity game invitation to participate in the geo-activity game. Or, the participating community member may decline participation in the geo-activity game. In some embodiments, if the participating community member ignores the query or does not respond to the query within some predefined query duration, then the absence of the response is interpreted to be a declining response.

In some embodiments, the participating community member will rate the subject media content event as part of their answer to the invitation. Here, in response to receiving a rating from the participating community member, play of the geo-activity game may be initiated.

Optionally, a geo-activity game invitation will permit the invited participating community member to specify a day, date, and/or time that they wish to begin their participation in the geo-activity game. Here, the participating community member will specify the day, date, and/or time that they wish to initiate play of the geo-activity game. The responsive specification made by the participating community member may be made using their mobile device 126 and/or the media device 152. In some embodiments, the geo-activity game invitation may initially omit the option to specify the day, date, and/or time. Here, the participating community member may request this option and/or specify the day, date, and/or time that they wish to play the geo-activity game. If the participating community member specifies a later time to initiate play of the geo-activity game, then the geo-activity game is constructed based on the current user geographic location at the time of initialization of play.

Alternatively, or additionally, the geo-activity game invitation generated by the interaction facilitator system 100 may specify a suggested day, date, and/or time to initiate play of the geo-activity game. For instance, the determined current location of the participating community member may not be particularly suitable to begin game play. The current location may, for example, indicate that the participating community member is otherwise currently preoccupied with another task, such as while being at work or school, playing in or attending a sporting event or the like, visiting friends and/or family, etc. (interchangeably referred to herein as a preoccupying activity). Here, a later alternative initial geo-activity game play time may be suggested by the interaction facilitator system 100. In some embodiments, activity history of the participating community member may be used to determine a suggested alternative start day, date, and/or time for an initial geo-activity game play time. For example, the time that the participating community member is no longer at work, at school, or attending the sporting event or the like may be determinable or may be known. For example, a calendar maintained by or that is accessible by the participating community member's mobile user device 126 may be accessed to identify a suitable initial geo-activity game play time when the participating community member is not otherwise preoccupied. A suggested alternative initial geo-activity game play time may be defined by the interaction facilitator system 100 based on some predefined duration after the determined conclusion of the preoccupying activity of the participating community member. For instance, if the participating community member is known to not be working on certain days and/or at certain times, then the suggested alternative initial geo-activity game play time may be based on those known days and/or times when the participating community member is not preoccupied with another activity.

When the participating community member accepts the geo-activity game invitation to participate in the geo-activity game, embodiments of the interaction facilitator system 100 generate a unique geo-activity game for the eligible participating community member in response to the acceptance of the geo-activity game invitation. The generated geo-activity game is generated, in part, based on (1) a current determined location of the participating community member, (2) a determined end of game play location which is the location for the last geo-activity game activity, (3) a determined route of travel for the geo-activity game, and (4) identification of a plurality of intermediate game play locations that lie along the determined route of travel. Optionally, an incentive location is identified. The end of game play location, the plurality of intermediate game play locations, and the optional incentive location are generically referred to herein as game play locations. The determined route of travel that defines the path that the participating community member is to traverse during their play of the geo-activity game is referred to herein as the game play route. The generated geo-activity game play list includes location information that identifies the geographic locations of the incentive location, identifies geographic locations of the game play locations, and/or identifies a plurality of geographic locations that define the path of the game play route.

Also, a predefined maximum duration of game play may be used to generate the geo-activity game. The maximum duration of game play is predefined such that the participating community member does not spend an undesirable or unreasonable amount of time during play of the geo-activity game.

The information to determine the current geo-location of the participating community member that is determined by the geo-location determination module 102 may be acquired in a number of different manners. In some instances, the mobile device 126 that is being used by the participating community member provides location information that can be inferred to the same as the current geo-location of the participating community member. For example, the mobile device 126 may include a global positioning system (GPS). The interaction facilitator system 100 may query the mobile device 126 for the GPS information or the determined GPS location. Alternatively, or additionally, the current geo-location of the mobile user device 126 may be determined by cell tower locations that detect control signals emitted by the mobile device 126. In some embodiments, the information to determine the current geo-location of the participating community member is included in the reply from the participating community member which accepts the invitation to play the geo-activity game.

Alternatively, or additionally, information defining the current geo-location of the participating community member may be specified by the participating community member. For example, the participating community member may specify an address or other location identifier to the interaction facilitator system 100 using their mobile device 126.

Alternatively, or additionally, a determined location associated with consumption of the subject media content event may be used to determine the current geo-location of the participating community member. Here, if the subject media content event was consumed at a theatre 170, and if the current time corresponds to the end of presentation of the subject media content event (or if the current time is shortly after the end of presentation by some predefined threshold), then the current geo-location of the participating community member can be assumed to correspond to the address or other known location of the theatre 170. For instance, the presentation start time and end time for the subject media content event may be obtained from a media content event presentation schedule that is maintained by the theater or another entity.

As another example, the subject media content event may have been presented to the participating community member by the media device 152. Typically, the location of the media device is known, which is the home address or another address associated with the participating community member. If the current time corresponds to the end of presentation of the subject media content event (or if the current time is shortly after the end of presentation by some predefined threshold), then the current geo-location of the participating community member can be assumed to correspond to the address or other known location of the media device 152. Here, use of the media device 152, including presentation times and information identifying consumed media content event, may be communicated from the media device 152 to the interaction facilitator system 100 via the backchannel 166.

After the current geo-location of the participating community member has been determined and the subject media content event has been identified, an end of game play location is determined. An end of game play location is a geo-location for the last geo-activity game activity. Upon completion of the activity associated with the unique geo-activity game that has been generated for the participating community member, play of the geo-activity game concludes. The incentive location is a location that where the participating community member goes to and acquires their incentive for completing the geo-activity game.

The geo-activity game also includes information that identifies a plurality of intermediate game play locations. An intermediate game play location is a location where the participating community member performs a designated activity. The intermediate game play locations are located along the route of the geo-activity game.

Accordingly, a geo-activity game play list includes information specifying a path that the community member is to traverse while they are playing the geo-activity game (interchangeably referred to herein as a geo-activity game route), location information identifying the location of a plurality of intermediate game play locations that lie along the geo-activity game route, information identifying an end of game play location (which is the last game play location of the geo-activity game), and optional information identifying an incentive location. These end of game play locations, intermediate game play locations, and incentive locations are collectively referred to herein as game play locations. Further, the geo-activity game play list includes information specifying each activity that is to be performed by the participating community member at each game play location.

Information identifying location information and attributes of a plurality of game play locations are stored in the geo-location database 112. Attributes of these game play locations include, but are not limited to, a media content event attribute, an activity attribute, a location attribute, and an optional time attribute.

The media content event attribute includes an identifier of the media content event, such as a title or the like, that is associated with each game play location. Further, the identifiers of a plurality of different media content events may be associated with the media content event attribute for a single game play location. That is, a single game play location may be associated with many different media content events.

The activity attribute includes an identifier and/or a descriptor of at least one geo-activity game activity that is to be performed by the participating community member while at that particular game play location. Preferably, the activity attribute is also associated with a particular media content event(s). Further, instructions (text or images) that are to be communicated to the participating community member that describes the tasks and/or questions that are to be completed may be included in the activity attribute. Further, a plurality of different activity attributes may be associated with a particular game play location. For example, the game play location may relate to a plurality of different media content events, one of which may be the subject media content event. Accordingly, a particular geo-activity game activity that pertains to the subject media content event may be selected from the activity attribute.

The time attribute identifies particular times and/or durations that the game play location may be used (a qualifying time) or a time that the game play location may not be used (a disqualifying time) in a generated geo-activity game. For example, if the end time of the geo-activity game is late at night, the end time may be after the closing of the associated end of game play location. Accordingly, that particular end of game play location would not be selected when the geo-activity game was generated. That is, the game play may have times that they may be used, and other times that they may not be used, for play of a generated geo-activity game. Here, if the time that the participating community member is anticipated to be at during their play of the geo-activity game does not fall within a qualifying time, then that particular game play location will not be selected when the geo-activity game is generated by the interaction facilitator system 100. The current time that a geo-activity game is to be played may be determined form information provided by the clock 120 or another remote or local time information device.

To determine the end of game play location, a game play geographic region is initially defined. A plurality of different end of game play locations will lie within the game play geographic region. Preferably, the current geo-location of the participating community member will lie within the game play geographic region.

In an example embodiment, a radius of a predefined distance is determined to define a circular game play geographic region. Preferably, the current geo-location of the participating community member is located at or near to (interchangeably referred to herein as proximate to) the center or centroid of the circular game play geographic region that is defined by the predefined radius. Any suitable predefined radius may be used by the various embodiments. Any suitable criteria may be used to define the radius of a circular game play geographic region.

In an example embodiment, a maximum travel time is used to define a travel distance. The maximum travel time is used to compute the maximum travel distance that can be traversed by the participating community member. That is, a determination is made of how far (distance) the participating community member can travel within the predefined maximum travel time. The travel distance is then selected as the length of the radius. Here, travel times from the current geo-location of the participating community member and the outer edge of the circular game play geographic region is determinable. Here, the maximum travel time is proportional to the amount of time that play of the geo-activity game will require of the participating community member.

The maximum travel time may be predefined based on a number of factors. A first factor is how long of a play duration will be required of the participating community member for completion of the geo-activity game activities. The predefined maximum travel time must be reasonable so as not to impose an undue burden on the participating community member. Also, the maximum travel time must not be so long that the participating community member will become disengaged with the geo-activity game because it takes an undesirable length of time to complete. For example, a five hour duration to complete all geo-activity game activities of the geo-activity game may be an unreasonable length of time for some participating community members because they are likely to lose interest in the geo-activity game and/or may choose to end their participation in the geo-activity game before completion of all of the geo-activity game activities. On the other hand, the maximum travel time must not be so short so as to not encompass at least one end of game play location. Further, the game play geographic region must not be so small that a generated geo-activity game is not an interesting challenge to the participating community member. One skilled in the art appreciates that if a game can be completed to quickly or easily, a game participant is more than likely to not enjoy their participation in the game. For example, a predefined maximum travel time of five minutes may be too short of a duration.

The maximum travel distance may be further adjusted based on a variety of factors. For example, travel mode of the participating community member may be used to adjust the maximum travel distance. If the participating community member is walking, then a relatively short maximum travel distance may be used to define the game play geographic region. On the other hand, if the participating community member is riding a bicycle or the like, a larger maximum travel distance may be used. And, if the participating community member is driving a vehicle, an even greater maximum travel distance may be defined. Here, each of the maximum travel distances that are defined based on the mode of travel of the participating community member will have the same, or approximately the same, predefined maximum travel time.

The travel mode may be determined in a variety of manners. In an example embodiment, a rate of travel of the mobile device 126 of the participating community member may be used to estimate the travel mode. Here, a known average speed for walking, for riding a bike, and travelling in a vehicle can be compared with the current rate of travel of the mobile device 126. A match between the current rate of travel of the mobile device 126, which can be reasonably inferred to be the rate of travel of the participating community member who is in possession of the mobile device 126, and one of the known travel rates is used to determine if the participating community member is walking, riding a bike, or riding in a vehicle. Other modes of travel may be identified by the various embodiments.

Alternatively, or additionally, the participating community member may specify their mode of travel and/or their rate of travel. Here, the participating community member may use their mobile device 126 to specify this information, which is then communicated to the interaction facilitator system 100. The specified mode of travel may then be used to define the maximum travel distance and/or to define a geo-activity game.

The number of intermediate game play locations of the uniquely generated geo-activity game may also be used to adjust the size of the game play geographic region and/or to define a geo-activity game. For example, a geo-activity game may be defined using ten game play locations. A that uses only ten intermediate game play locations may result in a definition of a larger game play geographic region than a geo-activity game that has five intermediate game play locations. That is, when the geo-activity game is generated by some embodiments, one of the optional game-generation conditions is a predefined number of intermediate game play locations, or a number range of intermediate game play locations, that are to be used for the geo-activity game. That is, information that specifies a predefined number of game play locations is accessed. Then, a number of game play locations are selected so that the total number of game paly locations does not exceed the predefined number of or range of game play locations. In some situations, if a larger number of intermediate game play locations are required, then the game play geographic region may have to be enlarged to ensure that the requisite number of candidate end of game play locations are available for selection.

Alternatively, or additionally, an estimated completion time for each activity for each intermediate game play location may be considered when determining the size of the game play geographic region and/or in defining a geo-activity game. These estimated activity completion times may be stored as time attributes. Here, the estimated completion time for each activity for each intermediate game play location is a duration of time that may be known, may be determined, or may be predefined. The estimated completion times for each intermediate game play location and the estimated completion time of end of game play location are summed. This total estimated completion time is then subtracted from a predefined maximum game play time. If the total estimated game play time is less than the predefined maximum game play time by some predefined duration, then an additional game play location may be added to the geo-activity game play list so that the new total estimated game play time more closely approximates a predefined desired duration of game play and/or the predefined maximum game play time. On the other hand, if the total estimated game play time is greater than the predefined maximum game play time by some other predefined duration, then one of the game play location may be selected and eliminated from the geo-activity game play list so that the new total estimated game play time more closely approximates a predefined desired duration of game play and/or the predefined maximum game play time.

Alternatively, or additionally, the total estimated completion time may be subtracted from a predefined maximum travel time. The remaining time (the difference between the predefined maximum travel time and the sum of the estimated completion times) corresponds to a time that is available for the participating community member to travel from the initial current geo-location of the participating community member to the series of intermediate game play locations and then on to the end of game play location. If the total estimated game play time is less than the predefined maximum game play time by some predefined duration, then an additional game play location may be added to the geo-activity game play list so that the new total estimated game play time more closely approximates a predefined desired duration of game play, the predefined maximum travel time, and/or the predefined maximum game play time. On the other hand, if the total estimated game play time is greater than the predefined maximum game play time by some other predefined duration, then one of the game play location may be selected and eliminated from the geo-activity game play list such that the new total estimated game play time more closely approximates a predefined desired duration of game play, the predefined maximum game play time, and/or the predefined maximum game play time.

The travel time between each of the game play locations (the intermediate game play locations and the end of game play location) may also be determinable. Any suitable time-of-travel algorithm may be used by the various embodiments to determine the travel time between each of the game play locations. When the determined travel times, measured as a time duration, are summed with the sum of the estimated completion times, that sum is compared with the predefined maximum travel time. If the sum exceeds the predefined maximum travel time, then one or more of the initially selected intermediate game play locations may be removed from the geo-activity game play list for a generated geo-activity game. Then the sum is recomputed and then compared with the predefined maximum travel time. The process continues on an incremental fashion until the sum of the travel times and the sum of the estimated completion time for each activity for each intermediate game play location and the end of game play location is less than or equal to the predefined maximum travel time.

Alternatively, or additionally, the estimated completion time for each activity and the travel time between each of the game play locations may be summed to define a total estimated time of game play. The determined total estimated time of game play is compared with a maximum total estimated time of game play. If the determined total estimated time of game play exceeds the maximum total estimated time of game play, then one or more intermediate game play locations may be eliminated so that a new determined total estimated time of game play does not exceed the maximum total estimated time of game play. Here, a new path is determined that extends from the immediately prior game play location to the next game play location that is after the eliminated game play location.

Alternatively, or additionally, the determined total estimated time of game play is compared with a minimum total estimated time of game play. If the determined total estimated time of game play is less than the minimum total estimated time of game play, then one or more intermediate game play locations may be added so that a new determined total estimated time of game play exceeds the minimum total estimated time of game play.

In other embodiments, any suitable geographic region may be defined as the game play geographic region. For example, a city, town or other geographic region may be subdivided into a plurality of adjacent game play geographic regions (much like a region is divided into a plurality of voting regions). Such game play geographic regions may be defined using any suitable criteria, such as a predefined maximum travel time and/or a maximum travel distance. When the geo-activity game is uniquely generated, the current geo-location of the participating community member is used to select the game play geographic region for the geo-activity game. Here, the game play geographic region that the current geo-location of the participating community member is at is selected.

Further, different pluralities of game play geographic regions may be used for generating a geo-activity game. A first plurality of relatively larger game play geographic regions may be used when the participating community member is using a vehicle for their travel between the intermediate game play locations and to the end of game play location. A second plurality of smaller game play geographic regions may be used if the participating community member is riding a bicycle. And, a third plurality of even smaller game play geographic regions may be used in the participating community member is walking.

In response to acceptance of the invitation to play the geo-activity game by the participating community member, embodiments of the interaction facilitator system 100 determine the current geo-location of the participating community member, and then select or define a suitable game play geographic region that encompasses the current geo-location of the participating community member. Based on the game play geographic region, a plurality of end of game play locations and intermediate game play locations that lie within the game play geographic region are identified from the geo-location database 112. That is, the geo-location database 112 comprises information about a first plurality of game play locations, wherein the location attribute defines the geographic location of that particular game play location.

Next, the media content event attributes for the plurality of end of game play locations and intermediate game play locations that lie within the game play geographic region are compared with the identifier of the subject media content event. Those ones of the plurality of end of game play locations and intermediate game play locations that lie within the game play geographic region and that have their media content event attribute that is associated with the subject media content event are identified or selected as candidate end of game play locations and candidate intermediate game play locations.

In practice, there may be a plurality of candidate end of game play locations that lie within the game play geographic region. However, there may be only a single candidate end of game play location. In the event that there are no candidate end of game play locations that lie within the game play geographic region, the size of the game play geographic region may be increased until one or more candidate end of game play locations are identified (which then lie within the enlarged game play geographic region).

The intermediate game play locations, the end of game play location, and the incentive location (and their associated attributes) are predefined prior to generation of a geo-activity game. Preferably, there is a thoughtful reasoning that is behind the selection of any particular game play location.

In some situations, a third party sponsors a particular game play location based upon some desired outcome that the third party has an interest in. For example, the third party may have a marketing and/or sales objective that they wish to accomplish. For example, if the game play location is a movie theatre, the third party may wish to entice the participating community member to purchase a theatre ticket, purchase consumable as a concessions stand, and/or purchase promotional materials related to the subject media content event or another media content event. If the third party owns or manages a retail outlet, the game play location may be at their retail sales store and the intent would be to entice the participating community member to make one or more point of sale purchases or the like while they are playing the geo-activity game. The entity that is managing the geo-activity game may optionally assess a charge or assess some other compensation to the third party for inclusion of the location of interest as one of the game play locations In other situations, the game play location may have some attribute that is anticipated to be of interest to the participating community member. That attribute may optionally be related to the subject media content event. For example, the game play location attribute may be a famous park, statue, fountain, museum, theatre, tourist site, or other notoriously well-known location. Here, including such a location as a game play location will result in a more interesting geo-activity game that the participating community member is more likely to enjoy.

In yet other situations, a game play location may have an attribute associated with the subject media content event and/or another media content event. For instance, the location may be a set location where a portion of the subject media content event was filmed. As another example, the location may be the residence of a famous actor. As yet another example, the location may have some promotional object associated with the subject media content event, such as a billboard, sign, figurine, or the like.

In the various embodiments, each intermediate game play location and end of game play location has an associated activity attribute. The activity attribute defines at least one activity that a participating community member must perform and/or complete before moving on to the next listed game play location. Preferable, such predefined activities are relatively easy to complete and are anticipated to be enjoyable to perform for the participating community member.

Figure 2:
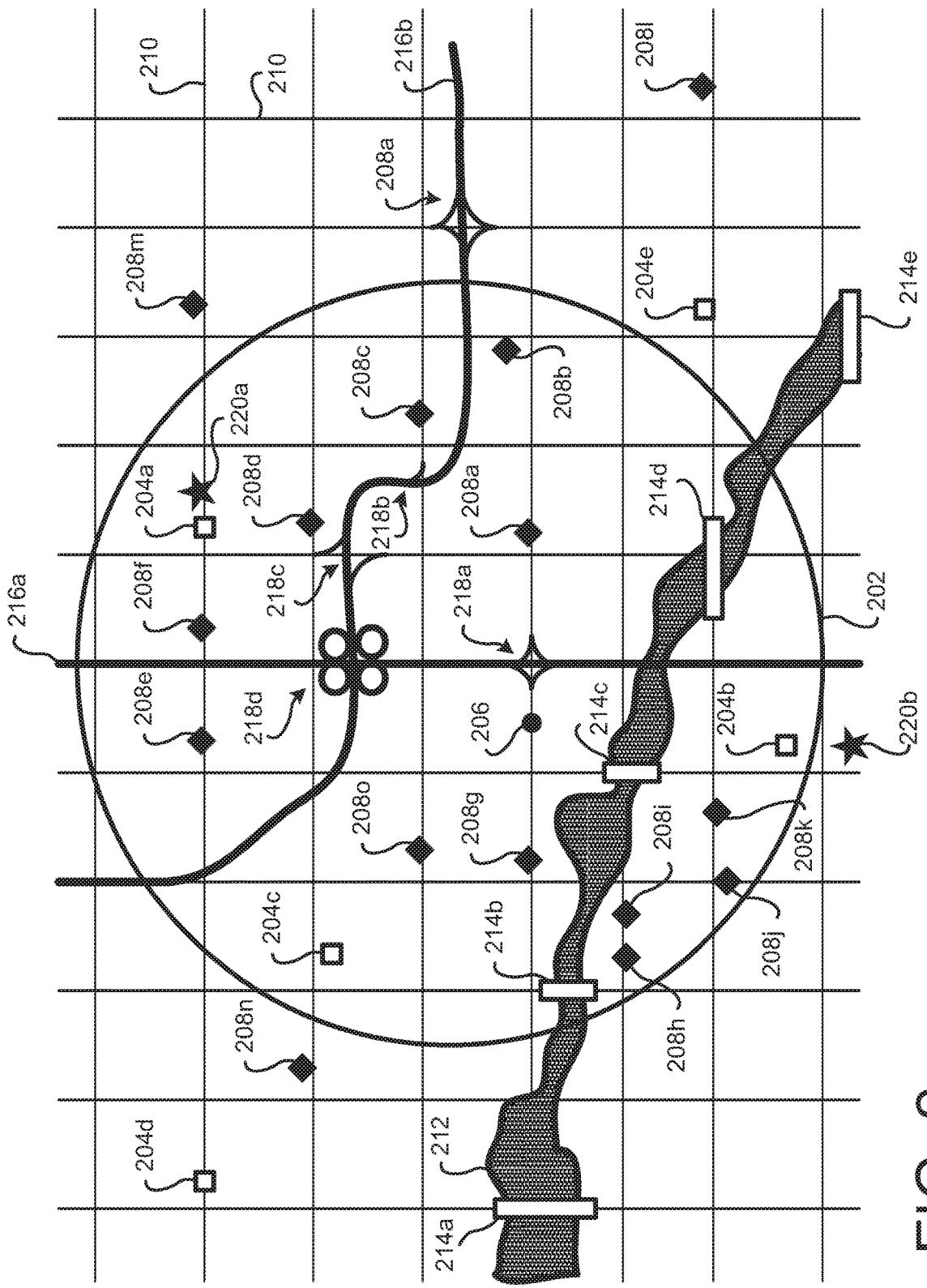
FIG. 2 illustrates a hypothetical selected game play geographic region that conceptually illustrates a plurality of candidate end of game play locations and a plurality of candidate intermediate game play locations.

FIG. 2 illustrates a hypothetical selected game play geographic region 202 that conceptually illustrates a plurality of end of game play locations 204*a*-204*e* and a plurality of intermediate game play locations 208*a*-208*n*. Once the current location of the participating community member is determined, the game play geographic region 202 is defined. The game play geographic region 202 is preferably defined to encompass the current location of the participating community member, and more preferably to have its center location in close proximity to or at the determined current location of the participating community member.

These end and intermediate game play locations (interchangeably referred to herein as game play locations) each have a media content event attribute that corresponds to the identifier of the subject media content event. That is, the end and intermediate game play locations are each related to the subject media content event. Other end and intermediate game play locations that are not related to the subject media content event that happed to lie within the game play geographic region 202 are not selected as candidate locations (because their media content event attributes are not related to the subject media content event).

The current geo-location 206 of the participating community member is also shown (denoted using a black filled circle symbol). The plurality of candidate intermediate game play locations 208*a*-208*n* are denoted using a black filled diamond symbol. Traffic streets 210 (denoted with light solid lines) indicate travel paths that are available to the participating community member to travel along for potential routes of travel. A river 212 is also illustrated, along with a plurality of bridges 214*a*-214*e* that permit travel across the river 212. Two highways 216*a* and 216*b* are illustrated traversing the game play geographic region 202, wherein a plurality of interchanges 218*a*-218*d* provide off ramps for entering onto and off of the highways 216*a* and 216*b*.

The plurality of end of game play locations 204*a*-204*e* are denoted using white filled square symbols. Some of the plurality of end of game play locations 204*a*-204*e* are located within the selected game play geographic region 202. Since these end of game play locations 204*a*-204*c* have their locations that lie within the game play geographic region 202, these end of game play locations 204*a*-204*c* are defined as, or are selected as, candidate end of game play locations. In contrast, the geo-locations for those end of game play locations that lie outside of the game play geographic region 202 are not selected as candidate end of game play locations (even though their media content event attributes correspond to the subject media content event). Accordingly, in the simplified hypothetical example of FIG. 2, the end of game play locations 204*d* and 204*e* would not be selected as candidate end of game play locations since their location lies outside of the game play geographic region 202.

Similarly, the intermediate game play locations 208a-208k have their locations that lie within the game play geographic region 202. Accordingly, these intermediate game play locations 208a-208k are defined as, or are selected as, candidate intermediate game play locations. In contrast, the locations for those intermediate game play locations that lie outside of the game play geographic region 202 are not selected as candidate end of game play locations or candidate intermediate game play locations. Accordingly, in the simplified hypothetical example of FIG. 2, the intermediate game play locations 208l-208m would not be selected as candidate intermediate game play locations since their location lies outside of the game play geographic region 202 (even though their media content event attributes correspond to the subject media content event).

Optionally, incentive locations 220a-220b (denoted with a black filled star) that identify one or more incentives that will be accessible to the participating community member upon successful completion of the geo-activity game. The information and various attributes for these incentive locations may be stored in the geo-location database 112. The incentive locations have associated location attributes that define the location of that particular incentive location. The incentive locations optionally have media content event attributes that include the identifiers of one or more media content events.

Further, incentive attributes (information identifying the particular one or more different incentives that are available) may be included with the information stored that has been stored in the geo-location database 112 for each of the incentive locations. In some instances, a particular incentive that is believed to be of particular interest to the participating community member may be selected as part of the process of generating a unique geo-activity game as the incentive for the participating community member.

The selected incentive may, in some instances, be particularly relevant to the subject media content event. Alternatively, or additionally, the incentive may be relatively valuable, and thus be very desirable to the participating community member. Alternatively, or additionally, personal information such as user preferences or user historical information for the participating community member (interchangeably referred to herein as a community member attribute) may be used to select a particular incentive from among a plurality of available incentives.

For example, an incentive location may correspond to a movie theatre. Available incentives at a movie theatre may be popcorn available at the concessions in the theatre and/or a free ticket to see a movie. If the participating community member has a preference for popcorn, or typically purchases popcorn while at the theatre (as determinable from historical purchase information), the free popcorn may be selected for that particular participating community member based on that participating community member's preferences and/or purchase history. In contrast, another participating community member may dislike popcorn, so free popcorn would not be a selected incentive. Alternatively, or additionally, the participating community member may not often go to a movie theatre. Here, the selected incentive may be a free movie ticket to induce the participating community member to go to the theatre.

Incentive locations preferably lie within the game play geographic region 202. Preferably, incentive locations are in close proximity to the candidate end of game play locations so as to be readily accessible by the participating community member after their completion of the geo-activity game. Alternatively, or additionally, an incentive location may be the same as or may be associated with one or more end of game play locations. For example, the incentive location 220a lies within the game play geographic region 202 and is in close proximity to the end of game play location 204a. However, incentive locations do not need to lie within the game play geographic region 202. For example, the incentive location 220b lies outside of the game play geographic region 202, yet is in close proximity to the end of game play location 204a. Accordingly, if the unique geo-activity game ends at the end of game play location 204b, the participating community member can easily go to the incentive location 220b to obtain their incentive.

Further, an end of game play location may also have incentives. That is, the end of game play location and the incentive location may be co-located. For example, the end of game play location 204c is not associated with a particular incentive location. Here, the end of game play location 204c is also an incentive location and/or has its own associated incentives.

Figure 3:
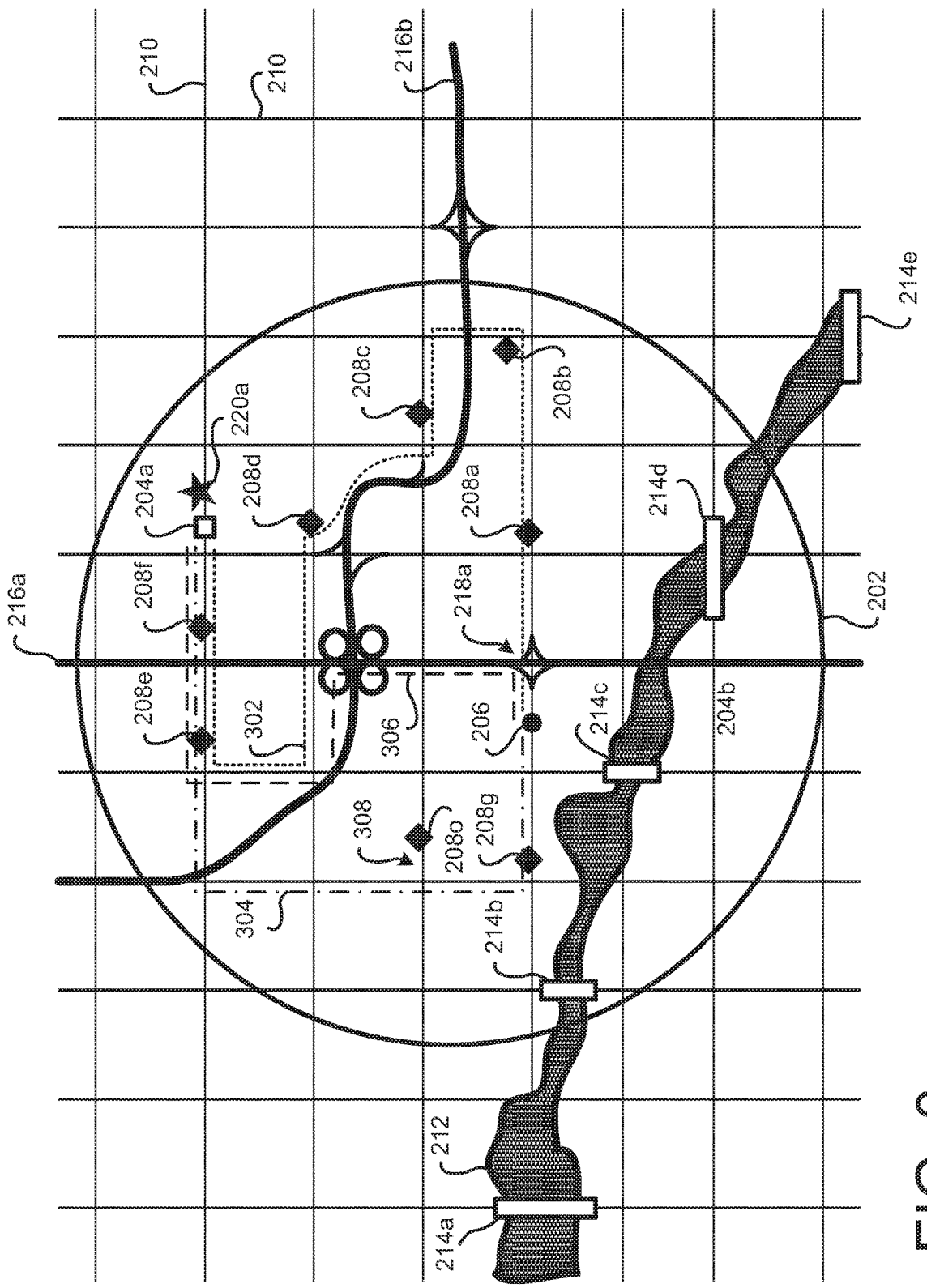
FIG. 3 conceptually illustrates a plurality of game play routes that have been identified based upon a selection of the end of game play location.

FIG. 3 conceptually illustrates a plurality of game play routes 302, 304 and 306 that have been identified based upon a selection of the end of game play location 204a. The candidate game play routes lie within the game play geographic region 202. In the various embodiments, the interaction facilitator system 100, executing the geographic game route mapper 104, identifies a plurality of candidate game play routes that starts at the current location of the participating community member and that ends at the selected end of game play location (in this simplified hypothetical example, the end of game play location 204a). Any suitable route determination module now known or later developed may be used to identify a plurality of candidate routes between the current location of the participating community member and a selected end of game play location.

Once a candidate game play route has been determined, then those candidate intermediate game play locations that are in proximity to that particular candidate game play route are identified. As noted herein, a predefined number of intermediate game play locations, or a predefined range of numbers of intermediate game play locations, are defined for a generated geo-activity game.

Here, the example first game play route 302 is in proximity to six identified intermediate game play locations 208a-208f. The example second game play route 304 is in proximity to three identified intermediate game play locations 208g, 208e and 208f. The example third game play route 306 is in proximity to two identified intermediate game play locations 208e and 208f. In the event that the predefined number of intermediate game play locations is six, then the candidate game play route 302 would be selected (since the other candidate game play routes 304 and 306 do not lie in proximity to six candidate intermediate game play locations).

As another example, a predefined range of five to seven intermediate game play locations may be used to generate a geo-activity game. Here, the candidate game play route 302 would similarly be selected. The candidate game play routes 304 and 306 would be rejected (since the other candidate game play routes 304 and 306 do not lie in proximity to the predefined range of candidate intermediate game play locations).

In some instances, a candidate game play route may not include the predefined number or range of intermediate game play locations. In such cases, the path of the candidate game play route may be adjusted to then become in proximity to a nearby intermediate game play location. For example, the candidate game play route 304 may be adjusted so as to become nearer to the intermediate game play location 208o, and thereby increase its number of proximate intermediate game play locations to four.

Here, the game play location 208o is a determinable distance 308 from the closest point along the candidate game play route 304. When a game play location does not lie along a candidate game play route, embodiments determine the distance from that game play location to the closest point along the candidate game play route. The determined distance is compared to a predefined threshold distance in an example embodiment. If the determined distance is less than the predefined threshold distance, then the path of the candidate game play route can be adjusted to add that game play location. In this simplified example, the determined distance 308 is assumed to be less than the predefined threshold distance. Accordingly, the path of the candidate game play route 304 may be adjusted to include this game play location 208o.

Alternatively, or additionally, travel time associated with traveling to and/or from the original candidate game play route 304 to the game play location 208o, here the distance 308, and/or a change in the total travel time of the adjusted route may be determined. The travel time and/or change in total travel time may be compared with a predefined threshold time. If the determined travel time associated with the distance 308 and/or the change in the total travel time of the adjusted route is less that the predefined threshold time, and the path of the candidate game play route 304 may be adjusted to include this game play location 208o.

In some instances, a candidate game play route may include more than the predefined number or range of intermediate game play locations. In such cases, one of the identified intermediate game play locations may be eliminated or de-selected. Such an eliminated intermediate game play location may be identified based on one or more elimination factors. An example elimination factor may be a comparison of the activity attribute of the intermediate game play location and a known user preference of the participating community member. Here, if an activity attribute of the intermediate game play location is different from the member's preference such that it is likely that the participating community member will not enjoy the associated activity as much as the activities of other identified intermediate game play locations, then that particular intermediate game play location may then be eliminated.

As another non-limiting example, the time to perform an activity associated with an intermediate game play location may be compared with a predefined time threshold. If the activity time of the intermediate game play location exceeds the time threshold, that particular intermediate game play location may be eliminated, thereby reducing the total time required for play of the geo-activity game. Here, a computed total time of estimated game play may be compared to a predefined target total game play time. A particular intermediate game play location(s) may be selected for elimination when the new adjusted total time of game play is reduced to the corresponding target total game play time. To illustrate, the candidate game play route 302 may be adjusted so as to eliminate the intermediate game play location 208b, and thereby decrease its number of proximate intermediate game play locations to five. Here, the candidate game play route 302 may be adjusted to travel directly from the intermediate game play location 208a to the intermediate game play location 208c, thereby reducing the total game play time.

Additionally, or alternatively, the total travel time associated with adjusting the path of the candidate game play route may be compared with the original total travel time. If the total travel time of the adjusted game play route is decreased by some amount, then that particular game play location may be eliminated from the geo-activity game. In some embodiments, the total game play time change may be optionally compared with a threshold time change. If the total game play time change is greater than the time threshold, that associated game play location could be selected for elimination. Alternatively, or additionally, for each candidate game play location, a total game play time change may be determined. The game play location associated with the greatest change (decrease) in total game play time may be selected for elimination from the geo-activity game.

As another non-limiting example, the distance of travel to an intermediate game play location may be compared with a predefined distance threshold. If the determined travel distance exceeds the distance threshold, that particular intermediate game play location may be eliminated, thereby reducing the total travel time and/or the total distance of travel required for play of the geo-activity game. Here, a computed total distance of travel may be compared to a predefined target total travel distance. A particular intermediate game play location(s) may be selected for elimination when the new adjusted total time of game play and/or the total distance of travel is reduced to the corresponding target values.

One skilled in the art appreciates that the process of generating candidate game play routes, identifying intermediate game play locations that are proximate to the identified candidate game play route, adjusting a candidate game play route to be more proximate to a particular intermediate game play location, and then final selection of the game play route from among the plurality of candidate game play routes, is an iterative process. In some embodiments, artificial intelligence algorithms may be used to facilitate the selection of a candidate game play route that is to be used for the generation of a geo-activity game.

Figure 4:
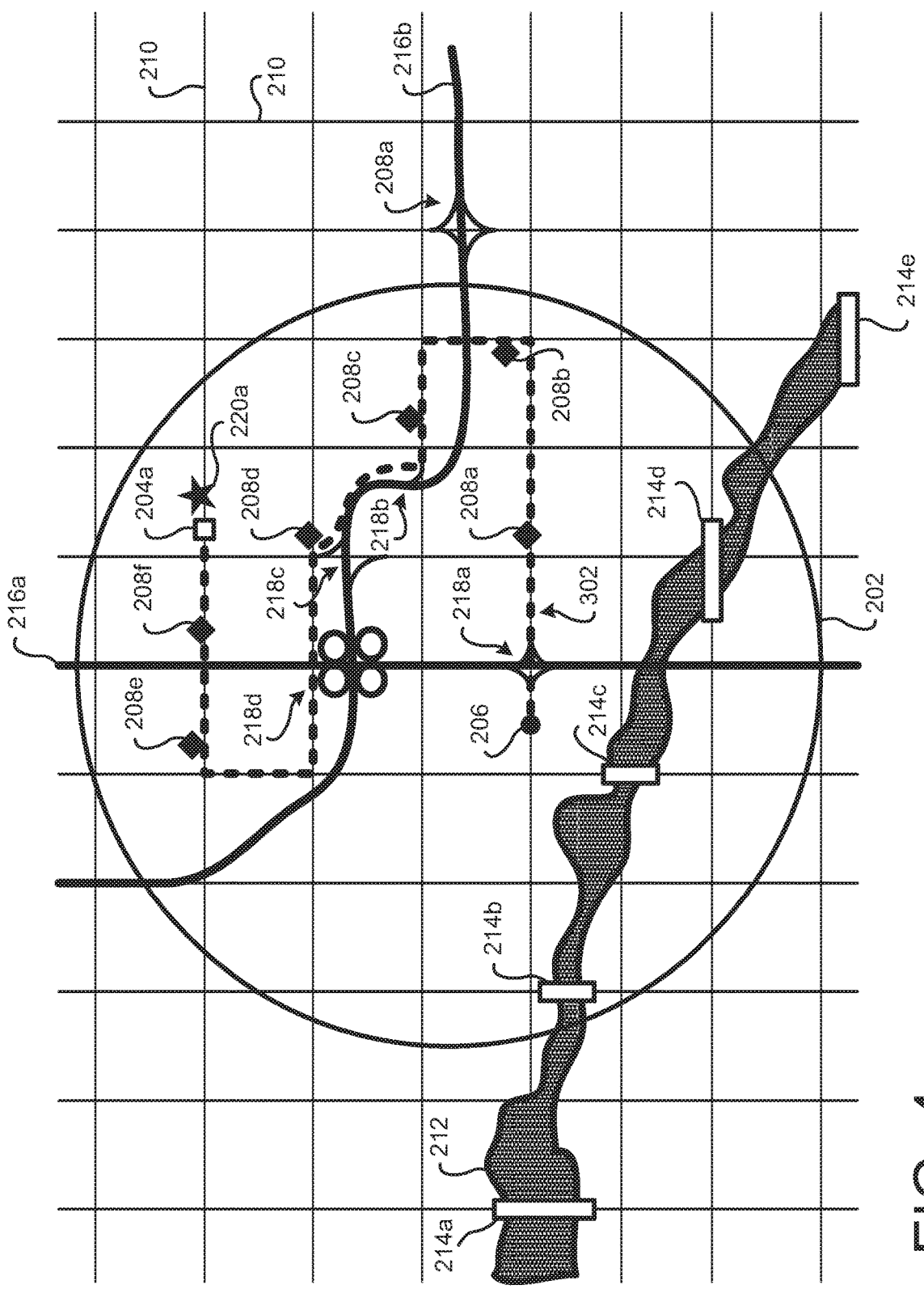
FIG. 4 illustrates the selected hypothetical candidate game play route 302 that has been selected for the generated geo-activity game.

FIG. 4 illustrates the selected hypothetical candidate game play route 302 that has been selected for the generated geo-activity game. The geo-activity game requires the participating community member to traverse the game play route 302, complete the activities associated with the intermediate game play locations 208a-208f and the end of game play location 204a, and then obtain their incentive at the incentive location 220a. In this simplified hypothetical example, the selection of this end of game play location 204a was based on determining that the participating community member is able to travel to the various intermediate game play locations, end of game play location, and/or an incentive location using a vehicle. Here, a portion of the game play route 302 has the participating community member entering the highway 216b at the interchange 218b and then exiting the highway 216b at the interchange 218c, thereby necessitating travel using a vehicle (since pedestrians and/or bicycle riders are typically not permitted on a highway).

Figure 5:
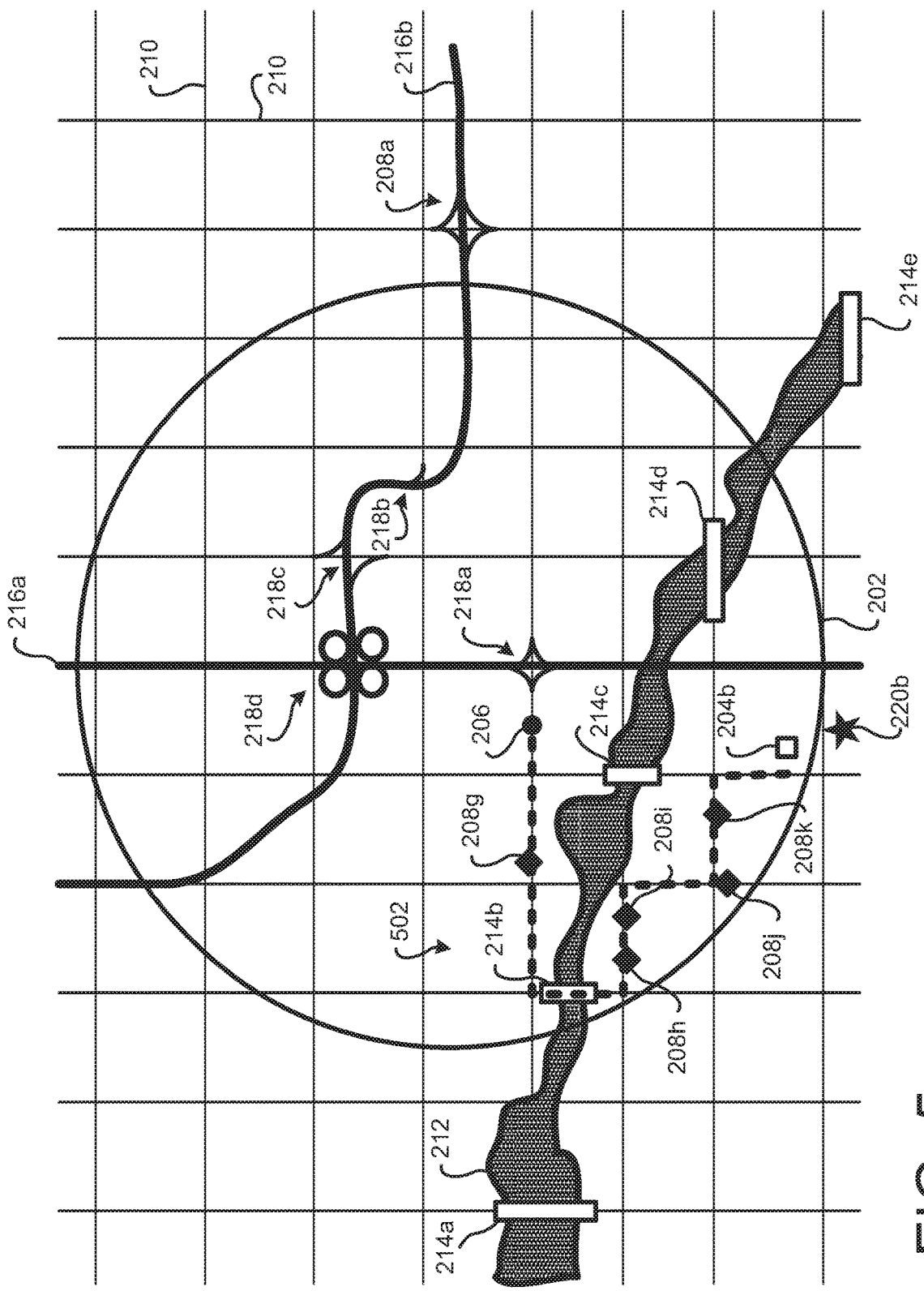
FIG. 5 illustrates an alternative selected hypothetical candidate game play route that has been selected for the generated geo-activity game that has an end of game play location.

FIG. 5 illustrates an alternative selected hypothetical candidate game play route 502 that has been selected for the generated geo-activity game that has an end of game play location 204b. The geo-activity game requires the participating community member to traverse the game play route 502, complete the activities associated with the intermediate game play locations 208g-208k and the end of game play location 204b, and then obtain their incentive at the incentive location 220b. In this simplified hypothetical example, the selection of this end of game play location 204b was based on determining that the participating community member is travelling to the various intermediate game play locations, end of game play location, and/or an incentive location by walking or by using a bicycle. Here, the total distance of the game play route 502 is significantly shorter that the above-described game play route 302 that is traversed using a vehicle. Further, the game play route 502 is likely to be safer for the participating community member (since a portion of the highway 216*b* is traversed during travel along the game play route 302, which is very likely to be quite dangerous to, or even illegal for, a person who is walking or who is riding a bicycle).

At one of the end and intermediate game play locations, or at another suitable location, the participating community member will be asked to provide a community member dialogue video. During generation of the community member dialogue video, the participating community member verbally expresses their personal opinions and/or personal viewpoints about the subject media content event. If the participating community member generates their community member dialogue video at a particular intermediate game play location, then generation of the community member dialogue video may be the designated activity that is to be performed at that particular intermediate game play location.

Alternatively, a different activity may have to be performed at that intermediate game play location before the participating community member generates their community member dialogue video. In such situations, the requisite activity is such that the participating community member's recollection of the subject media content event is improved so as to improve the quality and meaningfulness of the community member dialogue video.

In the various embodiments, a geo-activity game play list is presented to the participating community member using their mobile device 126. The geo-activity game play list is a listing that is presented to the participating community member that provides detailed information about each of the end and intermediate game play locations and the incentive. Preferably, the geo-activity game play list presents an ordered listing of each of the intermediate game play locations, indicates their geographic location (using a suitable address or the like), and indicates the activity that must be performed by the participating community member at each intermediate game play location. Optionally, travel directions between locations may be provided to the participating community member. The geo-activity game play list would conclude with information about the end of game play location, the activity that is to be performed at the end of game play location, information about the incentive location (if the incentive location is different from the end of game play location), and/or information describing the incentive (and optionally, information on how to obtain the incentive).

In some situations, the geo-activity game play list may be presented to the participating community member as audible information that is presented from the speaker 146 of their mobile device 126. Here, the audible information is presented in portions that audibly describe a current portion of the game play route and/or that audibly describes the activity that the participating community member is to do at the current game play location. For example, the audible information may describe a current portion of the game play route that the participating community member is to traverse to arrive at the next intermediate game play location or the end of game play location. When the participating community member arrives at the specified intermediate game play location and/or the end of game play location, then the specific activity that is to be performed by the participating community member is audibly described. This process of audibly providing game play travel instructions and/or activity instructions to the participating community member continues until the completion of the geo-activity game.

In other situations, the geo-activity game play list may be presented as visual information on the display 144 of their mobile device 126. In some situations, the visual game play information may be presented as textual information that is read by the participating community member. For example, textual game play information may specify an address of a particular intermediate game play location, end of game play location, and/or an incentive location. Alternatively, or additionally, street names or the like that are to be traveled upon may be listed as travel directions that the participating community member is to follow during play of the geo-activity game. Alternatively, or additionally, the textual game play information may describe the particular activity that is to be performed by the participating community member at the current game play location. Alternatively, or additionally, the textual information may provide specific instructions to receive the incentive. For example, an access code, an entitlement code, or the like may be given to the participating community member that authorizes them to receive their incentive.

In some situations, the visible information may be an image or a video clip that is presented on the display 144. The image or video clip may be used to describe the activity that is to be performed. As another non-limiting example, a map may be used to illustrate the game play route, and/or a current portion or next portion of the game play route. Alternatively, or additionally, if the activity is to be performed in proximity to a particular physical object, the visual information may show an image of the physical object. For example, the activity may require the participating community member to stand next to a billboard or other promotional material associated with the subject media content event, and then capture an image of themselves standing next to the physical object. As another non-limiting example, an image of the billboard or other promotional material may be visually presented to the participating community member, wherein the activity is performed in proximity to the billboard or other promotional material.

In some embodiments, the current location of the participating community member is constantly or periodically monitored as the participating community member is playing the geo-activity game. Here, the current location of the participating community member will indicate to the interaction facilitator system 100 where they are along the game play route on a real time basis, or near real time basis. If the participating community member fails to follow the currently described portion of the game play route, corrective information to re-route the participating community member may be provided.

Further, arrival of the participating community member at the next game play location can be determined by monitoring the current location of the participating community member. Upon their arrival, further instruction information may be provided, such as a description of the current activity that is to be performed at the newly arrived-at game play location.

In some embodiments, proof of activity completion is required before the participating community member proceeds to the next game play location. After providing proof of completion of the activity, information describing the next portion of the game play route and/or the next game play location may be presented to the participating community member.

Proof of activity completion may be determined in a variety of different manners. If a promotional item or other physical object is to be purchased or otherwise acquired, an image of the purchase receipt may be captured using the camera 148 of the participating community member's mobile device 126. As another example, if the participating community member is required to take a picture of some object or of themselves in proximity to an object, the camera 148 can be operated to capture the requisite image. The image information may then be sent to the interaction facilitator system 100. Object recognition techniques can be used by the interaction facilitator system 100 to analyze the received image information, and then to determine whether the activity has been satisfactorily completed.

If a promotional object or other object is to be purchased, point of sale information may be communicated to the interaction facilitator system 100. For example, a credit card or debit card receipt may be communicated to the interaction facilitator system 100. Alternatively, or additionally, proof of purchase information may be provided to the interaction facilitator system 100 by a third party, such as the vendor, a bank, or a credit card company.

In some instances, the participating community member may report to the interaction facilitator system 100 that they have completed the activity. For example, the participating community member may use their mobile device 126, such as by operating a numeric key pad or a touch sensitive screen, to specify completion of the requisite activity.

In some instances, the participating community member may verbally provide the activity confirmation to the interaction facilitator system 100. For example, the participating community member may place a telephonic call into the interaction facilitator system 100. An electronic-based answering system may receive the call and record the participating community member's voice. Speech recognition algorithms may then determine the words spoken by the participating community member. A natural language algorithm may then determine whether or not the participating community member has provided acceptable proof of activity completion based on their spoken words.

In situations where a trivia question is asked, the participating community member may use their mobile device 126 to specify the trivia question answer. The answer may be specified by operating a numeric key pad or a touch sensitive screen of the mobile device 126 or of another electronic device. Alternatively, or additionally, the participating community member may verbally articulate their answer to an electronically-based answering system at the interaction facilitator system 100 that is communicatively coupled to their mobile device 126.

A preferred trivia question is a type of question that is related to the subject media content event and that requires the participating community member to be at a particular associated game play location. Preferably, the trivia question pertains to the subject media content event. The trivia questions may include a clue or the like pertaining to the subject media content event or some other type of clue that must be solved by the participating community member to solve the trivia question. Trivia questions and/or the associated clues may be presented using visible image information and/or audible information depending upon the features of the mobile device participating community member.

For example, the trivia question may ask for a description or identification of a physical object that is located at the associated game play location. The object may be related to the subject media content event. An example clue may be an image of the object or of other objects in the vicinity of the object of interest. Audible words and/or readable text may be presented to the participating community member to impart the trivia question and/or clue pertaining to the physical object that is to be found or identified. Alternatively, or additionally, clues needed to correctly answer a trivia question may be found only at the associated intermediate game play location and/or end of game play location.

In some situations, a plurality of participating community members may cooperatively participate in a generated geo-activity game. For example, a group of friends may have just seen a movie in the theatre 170 (FIG. 1). If one or more of the group of friends are eligible community members, then a group invitation may be sent from the interaction facilitator system 100 to the mobile devices 126. Upon acceptance of the group invitation, a unique geo-activity game is generated. Here, selection of the game locations may be based on preferences that are in common with the group of community members.

The group of community members may traverse the game play route together and cooperatively perform the associated activities. Alternatively, or additionally, one or more of the individuals of the group of community members may be directed to one or more of the game play locations to perform a specific activity associated with that particular game play location, while other individuals of the group of community members are directed to another different game play location.

In some embodiments, an invitation that is sent to the qualified community member provides a choice to play the geo-activity game by themselves (a single player version) or to play the geo-activity game with others. If the participating community member elects to play with others, then the participating community member may, in some situations, identify other community members that they would like to invite to play the geo-activity game. Invitations are then sent from the mobile device 126 of the participating community member and/or from the interaction facilitator system 100.

Alternatively, or additionally, if the invited participating community member wishes to play with other community members, some embodiments may automatically select one or more other community members (who have also recently consumed the subject media content event) that are then invited to play the geo-activity game with the participating community member. That is, the invited community member has responded to the invitation and has selected the option to participate in a group-based geo-activity game wherein a plurality of participating community members are playing the group-based geo-activity game together.

Here, current location of the other community members are compared with the current location of the participating community member. The distance between one or more of these other community members and the participating community member are determined. If the determined distance is less than or equal to a predefined threshold, then that other community member is invited to participate in the geo-activity game. That is, other community members who have also seen the subject media content event and that are in relatively close proximity to the invited participating community member are identified and then are invited to play a group-based geo-activity game. This embodiment provides the unexpected advantage of introducing community members to each other, and therefore enhances the personal investment of the community members in their involvement in the social community. In some embodiments, sex of the participating community members may be considered when defining a group of community members (similar to known personal dating applications).

In some situations, the initial game play location is at or is in close proximity to the participating community member who requested a group-play version of the geo-activity game. In other situations, an initial game play location is identified by the interaction facilitator system 100 that is in close proximity to all of the community members who have accepted the invitation to participate in the group-based geo-activity game. This location is provided to all of the participating community members, and play of the group-based geo-activity game may then commence when all participating community members are at the designated location.

When a group-based geo-activity game is being played by a plurality of participating community members, the activities that are selected for particular game play locations me be selected on a variety of factors. Preferably, but not necessarily, the game play activates pertain to the subject media content event. Some selected activities may be such that all of, or most of, the plurality of participating community members are able to participate in. Alternatively, a game play activity at a particular game play location may be defined for a particular one of the plurality of participating community members. Such a selected activity may be based on personal preferences and/or personal knowledge of the particular participating community member.

Alternatively, or additionally, a plurality of different game play activities may be defined for a particular game play location. Here, each of the activities are tailored to a particular one (or multiple ones) of the plurality of participating community members. For example, a first game play clue may require males of the plurality of participating community members to location and/or identify information on a movie poster in the men's restroom at the game play location, while a second game play clue may require females of the plurality of participating community members to location and/or identify information on another movie poster in the women's restroom at the game play location. Once the multiple game play activities have been completed at the current game play location, then game play may progress to the next game play location.

It should be emphasized that the above-described embodiments of the interaction facilitator system 100 are merely possible examples of implementations of the invention. Many variations and modifications may be made to the above-described embodiments. All such modifications and variations are intended to be included herein within the scope of this disclosure and protected by the following claims.

The invention claimed is:

1. A method performed by an interaction facilitator system that acquires community member dialogue videos generated by community members of a social media platform, wherein each community member dialogue video includes audible dialogue spoken by the community member that describes their viewpoints and opinions regarding an associated subject media content event, the method comprising:
    determining, at the interaction facilitator system, that a community member has consumed the subject media content event;
    receiving location information from a mobile device that is currently in possession of the community member;
    determining a current location, at the interaction facilitator system, of the participating community member based on the location information received from the mobile device;
    generating a geo-activity game, at the interaction facilitator system, based on the determined current location of the community member, wherein the geo-activity game is defined by:
        a game play route that defines a path that the community member is to traverse while they are playing the geo-activity game;
        a plurality of game play locations that the community member is to travel to, wherein each of the plurality of game play locations lie along the game play route; and
        a plurality of activities, wherein one of the plurality of activities are associated with one of the plurality of game play locations, and wherein each activity is to be completed by the community member while at the corresponding game play location;
    communicating a geo-activity game play list from the interaction facilitator system to the mobile device of the community member, wherein the geo-activity game play list specifies a location of each of the plurality of game play locations, wherein the geo-activity game play list specifies the activity that is to be performed at the associated game play location, and wherein an activity of one of the plurality of game play locations requires the community member to generate their community member dialogue video using their mobile device; and
    receiving the generated community member dialogue video at the interaction facilitator system.

2. The method of claim 1, wherein the plurality of game play locations is a second plurality of game play locations that are members of a first plurality of game play locations, and wherein generating the geo-activity game comprises:
    defining a game play geographic region, wherein the game play geographic region is based on a predefined maximum travel distance, and wherein the determined current location of the community member lies within the defined game play geographic region;
    accessing a location attribute for each of the first plurality of game play locations, wherein the location attribute includes information that identifies a geographic location of the associated game play location; and
    identifying a third plurality of game play locations from the first plurality of game play locations,
    wherein the geographic location of each one of the identified third plurality of game play locations lies within the defined game play geographic region.

3. The method of claim 2, and wherein generating the geo-activity game comprises:
    accessing information that identifies the subject media content event at the interaction facilitator system;
    accessing a media content event attribute for each of the third plurality of game play locations, wherein the media content attribute includes information that identifies at least one media content event that is associated with the game play location;
    comparing the information that identifies the subject media content event with the information that identifies the media content event associated with each of the third plurality of game play locations;
    identifying a plurality of candidate game play locations from the first plurality of game play locations, wherein the attribute information that identifies the media content event that is associated with each one of the plurality of candidate game play locations corresponds to the information that identifies the subject media content event, and wherein each of the candidate game play locations lie within the game play geographic region; and selecting the second plurality of game play locations for the geo-activity game from the plurality of candidate game play locations.

4. The method of claim 2, wherein a total distance of the path that the community member is to traverse while they are playing the geo-activity game does not exceed the maximum travel distance, and wherein generating the geo-activity game comprises:

determining a mode of travel that the community member will be using during play of the geo-activity game;

determining the maximum travel distance based on the determined mode of travel.

5. The method of claim 1, wherein generating the geo-activity game comprises:

accessing information that specifies a predefined number of game play locations, wherein a number of selected game play locations does not exceed the predefined number of game play locations.

6. The method of claim 1, wherein prior to generating the geo-activity game, the method further comprises:

generating, at the interaction facilitator system, an invitation that invites the community member to participate in the geo-activity game;

communicating the invitation from the interaction facilitator system to the mobile device of the community member; and receiving, at the interaction facilitator system, an acceptance from the mobile device, wherein the acceptance indicates that the community member is willing to participate in the geo-activity game, and wherein the geo-activity game is generated in response to receiving the acceptance.

7. The method of claim 6, wherein generating the invitation comprises:

identifying one of a preference and a purchase history the community member;

identifying a plurality of candidate incentives that are available at an incentive location, wherein the incentive location is a location that the community member may obtain an incentive after completion of the geo-activity game; and selecting the incentive to be obtained by the community member from a plurality of incentives based on the identified one of the preference and the purchase history the community member.

8. The method of claim 1, wherein determining that a community member has consumed a subject media content event comprises:

receiving media content event consumption information at the interaction facilitator system, wherein the media content event consumption information is communicated to the interaction facilitator system from one of the mobile device or a media device that presents media content to the community member, and wherein the media content event consumption information has an identifier that identifies a media content event that has been consumed by the community member using their mobile device or their media device;

comparing the identifier of the consumed media content event with identifiers of a plurality of media content events of interest, wherein the identifiers of the plurality of media content event of interest are stored at the interaction facilitator system, and wherein at least one community member dialogue video is desired for each of the plurality of media content events of interest; and selecting the consumed media content event as the subject media content event when the identifier of the consumed media content event matches the identifier of one of the plurality of media content events of interest.

9. The method of claim 1, wherein the received location information is second location information, and wherein determining that a community member has consumed a subject media content event comprises:

receiving first location information at the interaction facilitator system, wherein the media content event consumption information is communicated to the interaction facilitator system from the mobile device of the community member, and wherein the first location information is received before the second location information;

comparing the first location information with known locations of a plurality of theatres;

obtaining an identifier of a media content event that is playing at the theatre that has a location that is the same as the first location information;

comparing the identifier of the media content event that is playing at the theatre with identifiers of a plurality of media content events of interest, wherein the identifiers of the plurality of media content event of interest are stored at the interaction facilitator system, and wherein at least one community member dialogue video is desired for each of the plurality of media content events of interest; and selecting the media content event that is currently playing at the theatre as the subject media content event when the identifier of the media content event that is currently playing at the theatre matches the identifier of one of the plurality of media content events of interest.

10. The method of claim 1, wherein determining that a community member has consumed a subject media content event comprises:

receiving, at the interaction facilitator system, a specification of an identifier of a media content event that has been consumed by the community member, wherein the specification is generated by the community member using their mobile device or a media device that presents media content to the community member;

comparing the identifier of the consumed media content event with identifiers of a plurality of media content events of interest, wherein the identifiers of the plurality of media content event of interest are stored at the interaction facilitator system, and wherein at least one community member dialogue video is desired for each of the plurality of media content events of interest; and selecting the consumed media content event as the subject media content event when the identifier of the consumed media content event matches the identifier of one of the plurality of media content events of interest.

11. The method of claim 1, wherein generating the geo-activity game comprises:

defining a game play geographic region that encompasses a geographic area that the geo-activity game is to be played in, wherein the game play geographic region is based on a predefined maximum travel distance, and wherein the determined current location of the community member lies within the defined game play geographic region;

identifying a second plurality of incentive locations from a first plurality of incentive locations, wherein an incentive location is a location that the community member may obtain an incentive after completion of the geo-activity game,
wherein each incentive location has a location attribute that identifies a geographic location of that incentive location,
wherein the geographic location defined by the location attribute of the of the first plurality of incentive locations lie within the game play geographic region, and
wherein the geographic location defined by the location attribute of the of the other ones of the first plurality of incentive locations lie outside of the game play geographic region;
selecting one of the second plurality of incentive locations as an incentive location for the generated geo-activity game;
determining the game play route that defines the path that the community member is to traverse while they are playing the geo-activity game,
wherein the game play route begins at the current location of the community member, and
wherein the game play route ends at the selected incentive location for the generated geo-activity game; and
generating the geo-activity game play list, wherein the geo-activity game play list includes location information that identifies the geographic location of the incentive location and identifies a plurality of geographic locations that define the path of the game play route.

12. The method of claim 11, wherein generating the geo-activity game and generating the geo-activity game play list further comprises:
identifying a second plurality of game play locations from a first plurality of game play locations,
wherein each game play location has a location attribute that identifies a geographic location of that game play location,
wherein the geographic location defined by the location attribute of the of the first plurality of game play locations lie within the game play geographic region, and
wherein the geographic location defined by the location attribute of the of the other ones of the first plurality of game play locations lie outside of the game play geographic region; and
selecting a third plurality of game play locations from the second plurality of game play locations, wherein the geographic location of each one of the third plurality of game play locations lie along the path of the game play route,
wherein the generated geo-activity game play list identifies geographic location information for each of the third plurality of game play locations.

13. The method of claim 12, wherein generating the geo-activity game and generating the geo-activity game play list further comprises:
generating at least one of a textual description of the geographic location information for each of the third plurality of game play locations, an audible description of the geographic location information for each of the third plurality of game play locations, and image information that shows a map of the geographic location information for each of the third plurality of game play locations; and
communicating the at least one of the textual description, the audible description and the image information from the interaction facilitator system to the mobile device,
wherein the at least one of the textual description is presented on a display of the mobile device being used by the community member during play of the geo-activity game,
wherein the audible description is presented from a speaker of the mobile device being used by the community member during play of the geo-activity game, and
wherein the image information is presented is presented on the display of the mobile device being used by the community member during play of the geo-activity game.

14. The method of claim 12, wherein generating the geo-activity game and generating the geo-activity game play list further comprises:
identifying a plurality of intermediate game play locations from the third plurality of game play locations that lie along the path of the game play route; and
identifying an end of game play location from the third plurality of game play locations that lies along the path of the game play route,
wherein the end of game play location is the last game play location where an activity is performed by the community member during their play of the geo-activity game,
wherein the end of game play location is in proximity to the incentive location, and
wherein the generated geo-activity game play list identifies geographic location information for each of the plurality of intermediate game play locations and the end of game play location.

15. The method of claim 12, wherein generating the geo-activity game and generating the geo-activity game play list further comprises:
accessing at least one activity attribute that is associated with each one of the third plurality of game play locations, wherein the activity attribute defines an activity that is to be performed by the community member while at the associated game play location,
wherein the generated geo-activity game play list describes the activity that is associated with each of the third plurality of game play locations.

16. The method of claim 15, wherein generating the geo-activity game and generating the geo-activity game play list further comprises:
generating at least one of a textual description of the activity that is to be performed by the community member while at the associated game play location, an audible description of the activity that is to be performed by the community member while at the associated game play location, and image information showing the activity that is to be performed by the community member while at the associated game play location; and
communicating the at least one of the textual description, the audible description and the image information from the interaction facilitator system to the mobile device,
wherein the at least one of the textual description is presented on a display of the mobile device being used by the community member during play of the geo-activity game, wherein the audible description is presented from a speaker of the mobile device being used by the community member during play of the geo-activity game, and wherein the image information is presented is presented on the display of the mobile device being used by the community member during play of the geo-activity game.

17. The method of claim 15, wherein at least one of the third plurality of game play locations has a plurality of associated candidate activity attributes that each describe a different activity that is to be performed by the community member while at that associated game play location, and wherein generating the geo-activity game and generating the geo-activity game play list further comprises:

accessing a community member attribute of the community member;

comparing the community member attribute of the community member with the candidate activity attributes; and selecting as the activity attribute one of the candidate activity attributes that match the community member attribute of the community member, wherein the generated geo-activity game play list describes the activity that is associated with each of the third plurality of game play locations.

18. The method of claim 12, wherein each of the third plurality of game play locations has an associated estimated completion time that is estimated for completion of the activity that is to be performed by the community member while at that associated game play location, and wherein generating the geo-activity game and generating the geo-activity game play list further comprises:

determining travel times between each of the game play locations;

determining a total estimated time of game play for the geo-activity game, wherein the total estimated time of game play is the sum of the estimated completion time for each activity and the determined travel times;

comparing the total estimated time of game play with a maximum total estimated time of game play;

eliminating one of the game play locations from the geo-activity game in response to the total estimated time of game play exceeding the total estimated time of game play;

determining a new total estimated time of game play and comparing the new total estimated time of game play with the maximum total estimated time of game play; and repeating the steps of eliminating one of the game play locations from the geo-activity game in response to the total estimated time of game play exceeding the maximum total estimated time of game play, determining a new total estimated time of game play, and comparing the new total estimated time of game play with the maximum total estimated time of game play, until the new total estimated time of game play is less than the maximum total estimated time of game play.

19. The method of claim 18, wherein selecting an additional game play location comprises:

adjusting the game play route so that the selected eliminated game play location no longer lies along a new path of the game play route, wherein the new path extends from the immediately prior game play location and the next game play location that is after the eliminated game play location.

20. The method of claim 12, wherein each of the third plurality of game play locations has an associated estimated completion time that is estimated for completion of the activity that is to be performed by the community member while at that associated game play location, and wherein generating the geo-activity game and generating the geo-activity game play list further comprises:

determining travel times between each of the game play locations;

determining a total estimated time of game play for the geo-activity game, wherein the total estimated time of game play is the sum of the estimated completion time for each activity and the determined travel times;

comparing the total estimated time of game play with a minimum total estimated time of game play;

selecting an additional game play location that is added to the geo-activity game in response to the total estimated time of game play being less than the total estimated time of game play;

determining a new total estimated time of game play and comparing the new total estimated time of game play with the minimum total estimated time of game play; and repeating the steps of eliminating one of the game play locations from the geo-activity game in response to the total estimated time of game play being less than the minimum estimated time of game play, determining a new total estimated time of game play, and comparing the new total estimated time of game play with the minimum total estimated time of game play, until the new total estimated time of game play exceeds the maximum total estimated time of game play.

21. The method of claim 20, wherein selecting an additional game play location comprises:

determining a distance from a closest point on the path of travel of the game play route to each of a plurality of candidate game play locations;

selecting the additional game play locations that is to be added to the geo-activity game based on the determined distance, wherein the selected additional game play location has the shortest determined distance from the closest point on the path of travel of the game play route to each of a plurality of candidate game play locations; and adjusting the game play route so that the selected additional game play location lies along a new path of the game play route.

* * * * *